D. THOMAS, T. TAYLOR & T. H. BURRIDGE.
Expanding Pulley.

No. 211,356. Patented Jan. 14, 1879.

Witnesses:
Geo. H. Knight.
Walter Allen.

Inventors:
David Thomas
Thomas Taylor
Thomas H. Burridge
By Knight Bros.
Attys.

UNITED STATES PATENT OFFICE.

DAVID THOMAS, THOMAS TAYLOR, AND THOMAS H. BURRIDGE, OF ST. LOUIS, MISSOURI.

IMPROVEMENT IN EXPANDING PULLEYS.

Specification forming part of Letters Patent No. 211,356, dated January 14, 1879; application filed September 27, 1878.

*To all whom it may concern:*

Be it known that we, DAVID THOMAS, THOMAS TAYLOR, and THOMAS H. BURRIDGE, all of the city of St. Louis, in the State of Missouri, have invented a certain new and useful Improvement in Expanding Pulleys, of which the following is a full, clear, and exact description, reference being had to the accompanying drawings, forming part of this specification.

Our invention relates to certain improvements in the construction of expanding pulleys.

Pulleys constructed according to our invention have a flexible periphery, consisting of a number of sections fitted together, with lap expansive joints, as shown, so that the belt-surface will be continuous all around the periphery.

To the inner side of both ends of each section is attached a bar, extending the whole width of the periphery, and bearing against the inner side of the next section. One end of each section is made movable upon a bearing-block at the end of the pulley-spoke, and the other end of each section is attached to the next spoke, so that each section slides at one end upon the bearing at the end of a spoke. The arrangement is such that each section is sprung into the proper curve as the periphery of the pulley is expanded and contracted.

The means of adjustment consists in making the inner ends of the spokes of proper form to slide in suitable radial mortises of the hub, and each having a pin working in a radial slot, and extending through an inclined slot in a cam-collar turned upon the hub by a screw-gear.

Figure 1:
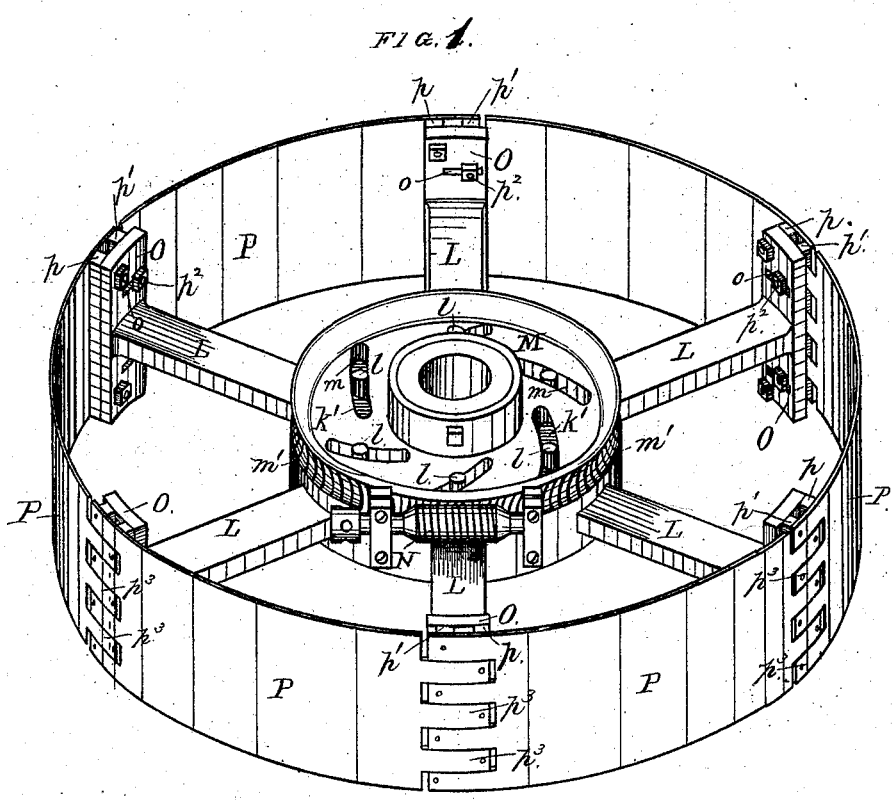
Figure 2:
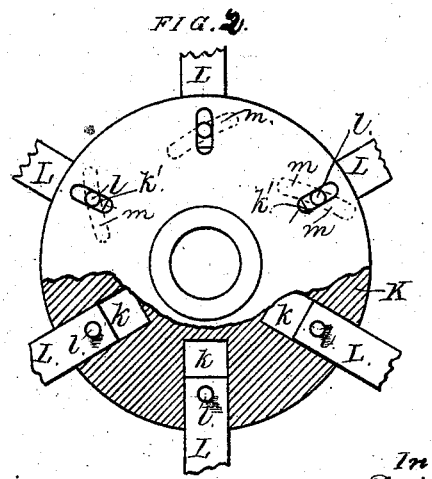

In the drawings, Figure 1 is a perspective view of an expanding pulley constructed according to our invention. Fig. 2 is an end view of the hub of a pulley, with part in section.

The expanding pulley is constructed as follows: K is the hub, having a number—say six, more or less—of radial mortises, $k$, with radial slots $k'$, through which extend pins or studs $l$ upon the sides of the spokes L. These pins $l$ also extend through inclined slots $m$ in a turning cam-plate, M. The inclination of the slots $m$ is such that as the cam-plate M is turned the spokes are moved inward or outward in the hub.

At the periphery of the cam-disk M is a screw-gear, $m'$, which is engaged by a gear-screw, N, so that by the turning of the screw the cam-disk is turned. The screw serves to hold the cam-disk and the spokes to their position when adjusted.

At the end of each spoke is a bearing plate or block, O, to which is attached one end of one of the sections P, which sections together constitute the periphery of the pulley.

The attachment of the section to the spoke is made through means of a bar, $p$, to which the end of the section is fastened, and which is in turn attached to the spoke end O. The opposite end of each section (to that which is fixed to the spoke) is attached to a bar, $p^1$, similar to that $p$.

The bar $p^1$ is not fixed rigidly to the block O, but is capable of sliding thereon as the periphery of the pulley is expanded or contracted.

The connection between bar $p^1$ and the block O is by means of bolts $p^2$, which pass through slots $o$ in the blocks.

The ends of the sections P are recessed, so as to interlock, as shown, the extension $p^3$ of one section occupying the recesses of the other, and the bars $p$ $p^1$ are attached to the extreme ends of the extension.

The outer bearing-surface of the block O is such that as the pulley-periphery is expanded or contracted the pressure of the block upon the bar $p^1$, taken in connection with the pressure of the bar $p$ upon the extensions $p^3$, will cause the section to take the proper curve in the arc of a circle equal in circumference to the pulley.

We claim as our invention—

1. The combination, in an expanding pulley, of the radially-adjustable spokes L and rim formed of flexible sections P, having interlocking ends $p^3$, as and for the purpose set forth.

2. The combination, in an expanding pulley, of the adjustable spokes L, slotted cam-disk M, adjusting screw-gear $m'$ at the periphery of the cam-disk, and the gear-screw N, for holding the cam-disk and spokes in their adjusted position, substantially as and for the purpose set forth.

3. An expanding pulley having a rim formed of sections P, with interlocking end $p^3$, for the purpose set forth.

4. The combination of screw-gear N $m'$, cam-disk M, spokes L, with pins $l$ and blocks O, and the flexible rim, composed of sections P, bearing upon the blocks O, for the purpose set forth.

DAVID THOMAS.
THOMAS TAYLOR.
THOMAS H. BURRIDGE.

Witnesses:
SAML. KNIGHT,
WILLIAM EVANS.